(12) United States Patent
Nguyen et al.

(10) Patent No.: US 9,881,207 B1
(45) Date of Patent: Jan. 30, 2018

(54) METHODS AND SYSTEMS FOR REAL-TIME USER EXTRACTION USING DEEP LEARNING NETWORKS

(71) Applicant: Personify, Inc., Chicago, IL (US)

(72) Inventors: Quang Nguyen, San Jose, CA (US);
Cong Nguyen, Ho Chi Minh (VN);
Long Dang, Ho Chi Minh (VN); Gia Dang, Ho Chi Minh (VN); Simion Venshtain, Chicago, IL (US)

(73) Assignee: Personify, Inc., Chicago, IL (US)

( * ) Notice: Subject to any disclaimer, the term of this patent is extended or adjusted under 35 U.S.C. 154(b) by 0 days.

(21) Appl. No.: 15/333,623

(22) Filed: Oct. 25, 2016

(51) Int. Cl.
*G06K 9/00* (2006.01)
*G06K 9/46* (2006.01)
*G06K 9/62* (2006.01)
*G06N 3/04* (2006.01)
*G06N 3/08* (2006.01)

(52) U.S. Cl.
CPC ....... *G06K 9/00369* (2013.01); *G06K 9/4652* (2013.01); *G06K 9/6232* (2013.01); *G06N 3/0445* (2013.01); *G06N 3/08* (2013.01)

(58) Field of Classification Search
None
See application file for complete search history.

(56) References Cited

U.S. PATENT DOCUMENTS

| 8,355 A | 9/1851 | Hurlbut |
|---|---|---|
| 5,001,558 A | 3/1991 | Burley |
| 5,022,085 A | 6/1991 | Cok |
| 5,117,283 A | 5/1992 | Kroos |
| 5,227,985 A | 7/1993 | DeMenthon |
| 5,343,311 A | 8/1994 | Morag |

(Continued)

FOREIGN PATENT DOCUMENTS

WO  2013019259  2/2013

OTHER PUBLICATIONS

Limmer, Matthias, et al. "Robust Deep-Learning-Based Road-Prediction for Augmented Reality Navigation Systems." arXiv preprint arXiv:1605.09533 (2016).*

(Continued)

*Primary Examiner* — Andrae S Allison
(74) *Attorney, Agent, or Firm* — Invention Mine LLC

(57) ABSTRACT

Methods and systems for real-time user extraction using deep learning networks. In one embodiment, user extraction comprises obtaining a given frame of color pixel data, checking whether a reset flag is cleared or set, and generating a trimap for the given frame. If the reset flag is cleared, generating the trimap comprises: obtaining a user-extraction contour based on a preceding frame; and generating the trimap based on the obtained user-extraction contour. If the reset flag is set, generating the trimap comprises: detecting at least one persona feature in the given frame; generating an alpha mask by aligning an intermediate contour with the detected persona feature(s), wherein the intermediate contour is based on a color-based flood-fill operation performed on a previous frame which was segmented by a machine-learning-segmentation process; and generating the trimap based on the generated alpha mask. The generated trimap is output for extracting a user persona.

22 Claims, 10 Drawing Sheets

(56) References Cited

U.S. PATENT DOCUMENTS

| | | | |
|---|---|---|---|
| 5,506,946 A | 4/1996 | Bar | |
| 5,517,334 A | 5/1996 | Morag | |
| 5,534,917 A | 7/1996 | MacDougall | |
| 5,581,276 A | 12/1996 | Cipolla | |
| 5,631,697 A | 5/1997 | Nishimura | |
| 5,687,306 A | 11/1997 | Blank | |
| 5,875,040 A | 2/1999 | Matraszek | |
| 6,119,147 A | 9/2000 | Toomey | |
| 6,125,194 A * | 9/2000 | Yeh | G06F 19/321 382/132 |
| 6,150,930 A | 11/2000 | Cooper | |
| 6,288,703 B1 | 9/2001 | Berman | |
| 6,411,744 B1 | 6/2002 | Edwards | |
| 6,618,444 B1 | 9/2003 | Haskell | |
| 6,661,918 B1 | 12/2003 | Gordon | |
| 6,664,973 B1 | 12/2003 | Iwamoto | |
| 6,760,749 B1 | 7/2004 | Dunlap | |
| 6,798,407 B1 | 9/2004 | Benman | |
| 6,937,744 B1 | 8/2005 | Toyama | |
| 6,973,201 B1 * | 12/2005 | Colmenarez | G06K 9/00295 382/103 |
| 7,050,070 B2 | 5/2006 | Ida | |
| 7,124,164 B1 | 10/2006 | Chemtob | |
| 7,317,830 B1 | 1/2008 | Gordon | |
| 7,386,799 B1 | 6/2008 | Clanton | |
| 7,420,490 B2 | 9/2008 | Gupta | |
| 7,420,590 B2 | 9/2008 | Matusik | |
| 7,463,296 B2 | 12/2008 | Sun | |
| 7,512,262 B2 | 3/2009 | Criminisi | |
| 7,518,051 B2 | 4/2009 | Redmann | |
| 7,574,043 B2 | 8/2009 | Porikli | |
| 7,599,555 B2 | 10/2009 | McGuire | |
| 7,602,990 B2 | 10/2009 | Matusik | |
| 7,631,151 B2 | 12/2009 | Prahlad | |
| 7,633,511 B2 | 12/2009 | Shum | |
| 7,634,533 B2 | 12/2009 | Rudolph | |
| 7,668,371 B2 | 2/2010 | Dorai | |
| 7,676,081 B2 | 3/2010 | Blake | |
| 7,692,664 B2 | 4/2010 | Weiss | |
| 7,720,283 B2 | 5/2010 | Sun | |
| 7,742,650 B2 | 6/2010 | Xu | |
| 7,747,044 B2 * | 6/2010 | Baker | G06K 9/6296 340/5.53 |
| 7,755,016 B2 | 7/2010 | Toda | |
| 7,773,136 B2 | 8/2010 | Ohyama | |
| 7,821,552 B2 | 10/2010 | Suzuki | |
| 7,831,087 B2 | 11/2010 | Harville | |
| 7,912,246 B1 * | 3/2011 | Moon | G06K 9/00221 382/103 |
| 7,965,885 B2 | 6/2011 | Iwai | |
| 8,073,196 B2 | 12/2011 | Yuan | |
| 8,094,928 B2 | 1/2012 | Graepel | |
| 8,131,011 B2 * | 3/2012 | Nevatia | G06K 9/00369 382/103 |
| 8,146,005 B2 | 3/2012 | Jones | |
| 8,175,379 B2 | 5/2012 | Wang | |
| 8,175,384 B1 | 5/2012 | Wang | |
| 8,204,316 B2 | 6/2012 | Panahpour | |
| 8,225,208 B2 | 7/2012 | Sprang | |
| 8,238,605 B2 | 8/2012 | Chien | |
| 8,249,333 B2 | 8/2012 | Agarwal | |
| 8,264,544 B1 | 9/2012 | Chang | |
| 8,300,890 B1 | 10/2012 | Gaikwad | |
| 8,300,938 B2 | 10/2012 | Can | |
| 8,320,666 B2 | 11/2012 | Gong | |
| 8,331,619 B2 | 12/2012 | Ikenoue | |
| 8,331,685 B2 | 12/2012 | Pettigrew | |
| 8,335,379 B2 | 12/2012 | Malik | |
| 8,345,082 B2 | 1/2013 | Tysso | |
| 8,355,379 B2 | 1/2013 | Thomas | |
| 8,363,908 B2 | 1/2013 | Steinberg | |
| 8,379,101 B2 | 2/2013 | Mathe | |
| 8,396,328 B2 | 3/2013 | Sandrew | |
| 8,406,494 B2 | 3/2013 | Zhan | |
| 8,411,149 B2 | 4/2013 | Maison | |
| 8,411,948 B2 | 4/2013 | Rother | |
| 8,422,769 B2 | 4/2013 | Rother | |
| 8,437,570 B2 | 5/2013 | Criminisi | |
| 8,446,459 B2 | 5/2013 | Fang | |
| 8,446,488 B2 | 5/2013 | Yim | |
| 8,477,149 B2 | 7/2013 | Nicholas Beata | |
| 8,503,720 B2 | 8/2013 | Shotton | |
| 8,533,593 B2 | 9/2013 | Grossman | |
| 8,533,594 B2 | 9/2013 | Grossman | |
| 8,533,595 B2 | 9/2013 | Grossman | |
| 8,565,485 B2 | 10/2013 | Craig | |
| 8,588,515 B2 | 11/2013 | Bang | |
| 8,625,897 B2 | 1/2014 | Criminisi | |
| 8,643,701 B2 | 2/2014 | Nguyen | |
| 8,649,592 B2 | 2/2014 | Nguyen | |
| 8,649,932 B2 | 2/2014 | Mian | |
| 8,655,069 B2 | 2/2014 | Rother | |
| 8,659,658 B2 | 2/2014 | Vassigh | |
| 8,666,153 B2 | 3/2014 | Hung | |
| 8,682,072 B2 | 3/2014 | Sengamedu | |
| 8,701,002 B2 | 4/2014 | Grossman | |
| 8,723,914 B2 | 5/2014 | Mackie | |
| 8,818,028 B2 | 8/2014 | Nguyen | |
| 8,831,285 B2 | 9/2014 | Kang | |
| 8,854,412 B2 | 10/2014 | Tian | |
| 8,874,525 B2 | 10/2014 | Grossman | |
| 8,890,923 B2 | 11/2014 | Tian | |
| 8,890,929 B2 | 11/2014 | Paithankar | |
| 8,897,562 B2 | 11/2014 | Bai | |
| 8,913,847 B2 | 12/2014 | Tang | |
| 8,994,778 B2 | 3/2015 | Weiser | |
| 9,008,457 B2 | 4/2015 | Dikmen | |
| 9,053,573 B2 | 6/2015 | Lin | |
| 9,065,973 B2 | 6/2015 | Graham | |
| 9,084,928 B2 | 7/2015 | Klang | |
| 9,087,229 B2 | 7/2015 | Nguyen | |
| 9,088,692 B2 | 7/2015 | Carter | |
| 9,117,310 B2 | 8/2015 | Coene | |
| 9,269,153 B2 | 2/2016 | Gandolph | |
| 9,285,951 B2 | 3/2016 | Makofsky | |
| 9,336,610 B2 | 5/2016 | Ohashi | |
| 9,542,626 B2 * | 1/2017 | Martinson | G06K 9/6256 |
| 9,659,658 B2 | 5/2017 | Kim | |
| 2002/0012072 A1 | 1/2002 | Toyama | |
| 2002/0025066 A1 | 2/2002 | Pettigrew | |
| 2002/0051491 A1 | 5/2002 | Challapali | |
| 2002/0158873 A1 | 10/2002 | Williamson | |
| 2004/0004626 A1 | 1/2004 | Ida | |
| 2004/0153671 A1 | 8/2004 | Schuyler | |
| 2004/0175021 A1 | 9/2004 | Porter | |
| 2005/0063565 A1 * | 3/2005 | Nagaoka | B60R 21/013 382/104 |
| 2005/0094879 A1 | 5/2005 | Harville | |
| 2005/0219264 A1 | 10/2005 | Shum | |
| 2005/0219391 A1 | 10/2005 | Sun | |
| 2005/0262201 A1 | 11/2005 | Rudolph | |
| 2006/0072022 A1 | 4/2006 | Iwai | |
| 2006/0193509 A1 | 8/2006 | Criminisi | |
| 2006/0221248 A1 | 10/2006 | McGuire | |
| 2006/0259552 A1 | 11/2006 | Mock | |
| 2006/0291697 A1 * | 12/2006 | Luo | G06K 9/00369 382/104 |
| 2007/0036432 A1 | 2/2007 | Xu | |
| 2007/0070200 A1 | 3/2007 | Matusik | |
| 2007/0110298 A1 | 5/2007 | Graepel | |
| 2007/0133880 A1 | 6/2007 | Sun | |
| 2007/0146512 A1 | 6/2007 | Suzuki | |
| 2007/0201738 A1 | 8/2007 | Toda | |
| 2007/0269108 A1 | 11/2007 | Steinberg | |
| 2008/0109724 A1 | 5/2008 | Gallmeier | |
| 2008/0181507 A1 | 7/2008 | Gope | |
| 2008/0219554 A1 | 9/2008 | Dorai | |
| 2008/0266380 A1 | 10/2008 | Gorzynski | |
| 2008/0273751 A1 | 11/2008 | Yuan | |
| 2009/0003687 A1 | 1/2009 | Agarwal | |
| 2009/0044113 A1 | 2/2009 | Jones | |
| 2009/0110299 A1 | 4/2009 | Panahpour | |
| 2009/0144651 A1 | 6/2009 | Sprang | |

(56) References Cited

U.S. PATENT DOCUMENTS

| | | |
|---|---|---|
| 2009/0199111 A1 | 8/2009 | Emori |
| 2009/0244309 A1 | 10/2009 | Maison |
| 2009/0245571 A1 | 10/2009 | Chien |
| 2009/0249863 A1 | 10/2009 | Kim |
| 2009/0278859 A1 | 11/2009 | Weiss |
| 2009/0284627 A1 | 11/2009 | Bando |
| 2009/0290795 A1 | 11/2009 | Criminisi |
| 2009/0300553 A1 | 12/2009 | Pettigrew |
| 2010/0027961 A1 | 2/2010 | Gentile |
| 2010/0034457 A1* | 2/2010 | Berliner ............. G06K 9/00362 382/154 |
| 2010/0046830 A1 | 2/2010 | Wang |
| 2010/0053212 A1 | 3/2010 | Kang |
| 2010/0128927 A1 | 5/2010 | Ikenoue |
| 2010/0166325 A1 | 7/2010 | Sengamedu |
| 2010/0171807 A1 | 7/2010 | Tysso |
| 2010/0195898 A1 | 8/2010 | Bang |
| 2010/0278384 A1 | 11/2010 | Shotton |
| 2010/0302376 A1 | 12/2010 | Boulanger |
| 2010/0302395 A1 | 12/2010 | Mathe |
| 2010/0329544 A1* | 12/2010 | Sabe ................ G06K 9/00288 382/159 |
| 2011/0038536 A1 | 2/2011 | Gong |
| 2011/0090311 A1 | 4/2011 | Fang |
| 2011/0115886 A1 | 5/2011 | Nguyen |
| 2011/0158529 A1 | 6/2011 | Malik |
| 2011/0193939 A1 | 8/2011 | Vassigh |
| 2011/0216965 A1 | 9/2011 | Rother |
| 2011/0216975 A1 | 9/2011 | Rother |
| 2011/0216976 A1 | 9/2011 | Rother |
| 2011/0242277 A1 | 10/2011 | Do |
| 2011/0243430 A1 | 10/2011 | Hung |
| 2011/0249190 A1 | 10/2011 | Nguyen |
| 2011/0249863 A1 | 10/2011 | Ohashi |
| 2011/0249883 A1 | 10/2011 | Can |
| 2011/0267348 A1 | 11/2011 | Lin |
| 2011/0293179 A1 | 12/2011 | Dikmen |
| 2011/0293180 A1 | 12/2011 | Criminisi |
| 2012/0051631 A1 | 3/2012 | Nguyen |
| 2012/0127259 A1 | 5/2012 | Mackie |
| 2012/0314077 A1 | 12/2012 | Clavenna, II |
| 2013/0016097 A1 | 1/2013 | Coene |
| 2013/0028476 A1 | 1/2013 | Craig |
| 2013/0094780 A1 | 4/2013 | Tang |
| 2013/0110565 A1 | 5/2013 | Means |
| 2013/0129205 A1 | 5/2013 | Wang |
| 2013/0142452 A1 | 6/2013 | Shionozaki |
| 2013/0147900 A1 | 6/2013 | Weiser |
| 2013/0243313 A1 | 9/2013 | Civit |
| 2013/0335506 A1 | 12/2013 | Carter |
| 2014/0003719 A1 | 1/2014 | Bai |
| 2014/0029788 A1 | 1/2014 | Kang |
| 2014/0063177 A1 | 3/2014 | Tian |
| 2014/0085398 A1 | 3/2014 | Tian |
| 2014/0112547 A1 | 4/2014 | Peeper |
| 2014/0119642 A1 | 5/2014 | Lee |
| 2014/0153784 A1 | 6/2014 | Gandolph |
| 2014/0229850 A1 | 8/2014 | Makofsky |
| 2014/0300630 A1 | 10/2014 | Flider |
| 2014/0307056 A1 | 10/2014 | Romea |
| 2017/0208243 A1* | 7/2017 | Masad ............... H04N 5/23222 |

OTHER PUBLICATIONS

E. Martinson and V. Yalla, "Real-time human detection for robots using CNN with a feature-based layered pre-filter," 2016 25th IEEE International Symposium on Robot and Human Interactive Communication (RO-MAN), New York, NY, 2016, pp. 1120-1125.*

Arbelaez, P., et ,al., "Contour detection and hierarchical image segmentation", Pattern Analysis and Machine Intelligence, IEEE Transactions on 33.4 (2011): 898-916.

Benezeth et al., "Review and Evaluation of Commonly-Implemented Background Subtraction Algorithms", 2008.

Carsten, R., et al., "Grabcut: Interactive foreground extraction using iterated graph cuts", ACM Transactions on Graphics (TOG) 23.3 (2004), pp. 309-314.

Crabb et al., "Real-Time Foreground Segmentation via Range and Color Imaging", 2008.

Gvili et al., "Depth Keying", 2003.

Kolmogorov, et al., "Bi-Layer Segmentation of Binocular Stereo Vision", IEEE, 2005.

Izquierdo' M. Ebroul. "Disparity/segmentation analysis: matching with an adaptive window and depth-driven segmentation." Circuits and Systems for Video Technology, IEEE Transactions on 9.4 (1999): 589-607.

Piccardi, M., "Background Subtraction Techniques: A Review", IEEE, 2004.

Wang, L., et al., "Tofcut: Towards robust real-time foreground extraction using a time-off camera.", Proc. of 3DPVT, 2010.

Xu, F., et al., "Human detection using depth and gray images", Advanced Video and Signal Based Surveillance, 2003., Proceedings, IEEE Conference on IEEE, 2003.

Zhang, Q., et al., "Segmentation and tracking multiple objects under occlusion from multiview video.", Image Processing, IEEE Transactions on 20.11 (2011), pp. 3308-3313.

Cheung et al., "Robust Techniques for Background Subtraction in Urban Traffice Video", 2004.

Kitagawa et al., "Background Separation Encoding for Surveillance Purpose by using Stable Foreground Separation", APSIPA, Oct. 4-7, 2009, pp. 849-852.

Lee, D.S., "Effective Gaussian Mixture for Video Background Subtraction", IEEE, vol. 27, No. 5, dated May 2005, pp. 827-832.

Akbarzadeh, A., et al., "Towards Urban 3D Reconstruction From Video," Third International Symposium on 3D Data Processing, Visualization, and Transmission, pp. 1-8 (Jun. 14-16, 2006).

Barnat, Jii'f, et al., "Cuda accelerated LTL Model Checking," FI MU Report Series, FIMU- RS-2009-05, 20 pages (Jun. 2009).

Canesta™, "See How Canesta's Solution Gesture Control Will Change the Living Room," reteieved Oct. 21, 2010, from http://canesta.com, 2 pages.

Chan, S.C., et al., "Image-Based Rendering and Synthesis," IEEE Signal Processing Magazine, pp. 22-31 (Nov. 2007).

Chan, Shing-Chow, et al. "The Plenoptic Video," 15(12) IEEE Transactions on Circuits and Systems for Video Technology 1650-1659 (Dec. 2005).

Chen, Wan-Yu, et al., "Efficient Depth Image Based Rendering with Edge Dependent Depth Filter and Interpolation," IEEE International Conference on Multimedia and Expo, pp. 1314- 1317 (Jul. 6, 2005).

Debevec, Paul, et al., "Efficient View-Dependent Image-Based Rendering with Projective Texture-Mapping," In 9th Eurographics Workshop on Rendering, pp. 105-116 (Jun. 1998).

Fehn, Christoph, et al., "Interactive 3-DTV-Concepts and Key Technologies," 94(3) Proceedings of the IEEE 524-538 (Mar. 2006).

GPGPU (General-purpose computing on graphics processing units)—Wikipedia, retrieved Nov. 17, 2009, from http://en.wikipedia.org/wiki/GPGPU, 9 pages.

Ho, Yo-Sung, et al., "Three-dimensional Video Generation for Realistic Broadcasting Services," ITC-CSCC, pp. TR-1 through TR4 (2008).

Jung, Kwang Hee, et al., "Depth Image Based Rendering for 3D Data Service Over T-DMB," IEEE, 3DTV-CON'08, Istanbul, Turkey, pp. 237-240 (May 28-30, 2008).

Kanade, Takeo, et al., "Virtualized Reality: Constructing Virtual Worlds from Real Scenes," IEEE MultiMedia, pp. 34-46 (Jan.-Mar. 1997).

Kao, Wen-Chung, et al., "Multistage Bilateral Noise Filtering and Edge Detection for Color Image Enhancement," 51 (4) IEEE Transactions on Consumer Electronics 1346-1351 (Nov. 2005).

Kipfer, Peter, "GPU Gems 3—Chapter 33. LCP Algorithms for Collision Detection Using CUDA," retrieved Nov. 17, 2009, from http://http.developer.nvidia.com/GPUGems3/qpugems3 ch33.html, 11 pages (2007).

Kubota, Akira, et al., "Multiview Imaging and 3DTV," IEEE Signal Processing Magazine, pp. 10-21 (Nov. 2007).

(56) References Cited

OTHER PUBLICATIONS

Lee, Eun-Kyung, et al., "High-Resolution Depth Map Generation by Applying Stereo Matching Based on Initial Depth Information," 3DTV-CON'08, Istanbul, Turkey, pp. 201-204 (May 28-30, 2008).

Mark, William R., et al., "Post-Rendering 3D Warping," In Proceedings of 1997 Symposium on Interactive 3D Graphics, Providence, RI, pp. 7-16 (Apr. 27-30, 1997).

McMillan, Jr., Leonard, "An Image-Based Approach to Three-Dimensional Computer Graphics," University of North Carolina at Chapel Hill, Chapel Hill, NC, 206 pages (1997).

Nguyen, Ha T., et al., "Image-Based Rendering with Depth Information Using the Propagation Algorithm," Proc. of IEEE International Conference on Acoustics, Speech, and Signal Processing (ICASSP), 4 pages (Mar. 2005).

Nguyen, Quang H., et al., "Depth image-based rendering from multiple cameras with 3D propagation algorithm," Proceedings of the 2nd International Conference on Immersive Telecommunications, 6 pages (2009).

Nguyen, Quang H., et al., "Depth Image-Based Rendering with Low Resolution Depth," 16th IEEE International Conference on Image Processing (ICIP), pp. 553-556 (2009).

PrimeSense, Home Page, retrieved Oct. 21, 2010, from http://www.primesense.com, 1 page.

Saxena, Ashutosh, et al., "3-D Depth Reconstruction from a Single Still Image," 76(1) International Journal of Computer Vision 53-69 (2007).

Shade, Jonathan, et al., "Layered Depth Images," Computer Graphics Proceedings, Annual Conference Series, pp. 231-242 (Jul. 19-24, 1998).

Tomasi, C., et al., "Bilateral Filtering for Gray and Color Images," Sixth International Conference on Computer Vision, pp. 839-846 (1998).

Vazquez, C., et al., "3D-TV: Coding of Disocclusions for 2D+Depth Representation of Multi- View Images," Proceedings of the Tenth IASTED Int'l Conference: Computer Graphics and Imaging, pp. 26-33 (Feb. 13-15, 2008).

Yang, Qingxiong, et al., "Spatial-Depth Super Resolution for Range Images," IEEE Conference on Computer Vision and Pattern Recognition, pp. 1-8 (2007).

Zhang, Buyue, et al., "Adaptive Bilateral Filter for Sharpness Enhancement and Noise Removal," IEEE ICIP, pp. IV-417—IV-420 (2007).

H. Y. Shum and S. B. Kang, "A Review of Image-based Rendering Techniques," Proc. IEEE/SPIE Visual Communications and Image (VCIP) 2000, pp. 2-13, Perth, Jun. 2000.

Um, Gi-Mun, et al., "Three-dimensional Scene Reconstruction Using Multi-View Images and Depth Camera", pp. 271-280, SPIE-IS&t, vol. 5664, 2005.

Zitnick, C. Lawrence, et al., "High-quality video view interpolation using a layered representation," 23(3) Journal ACM Transactions on Graphics (TOG)—Proceedings of ACM SIGGRAPH 2004, pp. 600-608 (Aug. 2004).

Working screenshot of Snagit manufactured by Techsmith, released Apr. 18, 2014.

Arbelaez, P., et ,a1., "Contour detection and hierarchical image segmentation", Pattern Analysis and Machine Intelligence, IEEE Transactions on 33.4 (2011): 898-916.

Lee, D.S., "Effective Gaussian Mixture Learning for Video Background Subtraction", IEEE, May 2005.

Yacoob, Y., et al., "Detection, analysis and matching of hair," in Computer Vision, 2005, ICCV 2005. Tenth IEEE International Conference, vol. 1, No., pp. 741-748, vol. 1., Oct. 17-21, 2005.

Talukder, A., et al., "Real-time detection of moving objects in a dynamic scene from moving robotic vehicles," in Intelligent Robots and Systems, 2003. (IROS 2003). Proceedings. 2003 IEEE/RSJ international Conference on, vol. 2, pp. 1308-1313, vol. 2, Oct. 27-31, 2003.

Sheasby, G., et al., "A robust stereo prior for human segmentation", In ACCV, 2012.

Hradis, M., et al., "Real-time Tracking of Participants in Meeting Video", Proceedings of CESCG, Wien, 2006.

\* cited by examiner

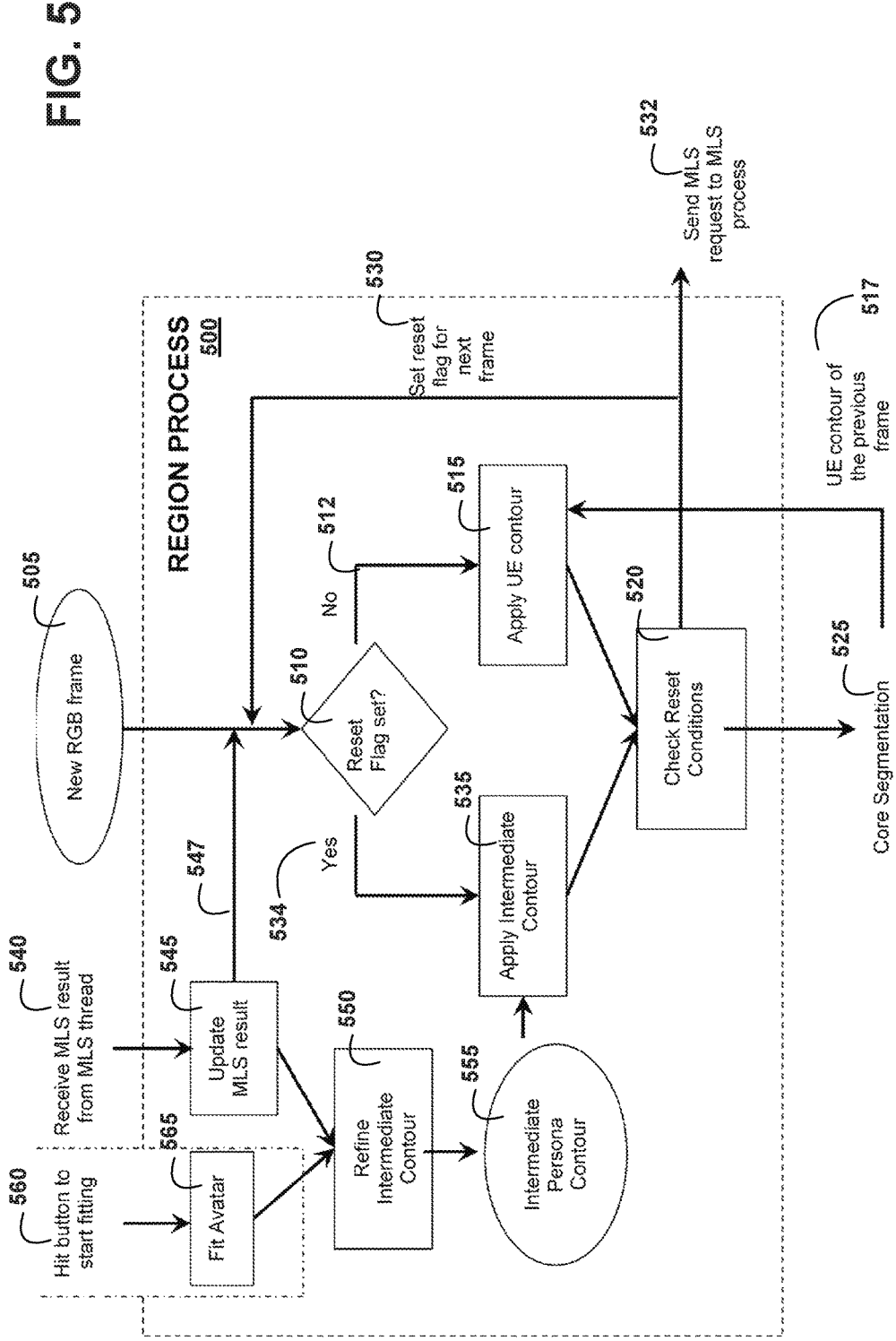

METHODS AND SYSTEMS FOR REAL-TIME USER EXTRACTION USING DEEP LEARNING NETWORKS

BACKGROUND

Online data communications are quite prevalent and pervasive in modern society, and are becoming more so all the time. Moreover, developments in software, communication protocols, and peripheral devices (e.g., video cameras), along with developments in other computing disciplines, have collectively enabled and facilitated the inclusion of multimedia experiences as part of such communications. Indeed, the multimedia nature and aspects of a given communication session are often the focus and even essence of such communications. These multimedia experiences take forms such as audio chats, video chats (that are usually also audio chats), online meetings (e.g., web meetings), and the like.

Using the context of online meetings as an illustrative example, it is often the case that one of the participants is the designated presenter, and often this designated presenter opts to include some visual materials as part of the offered presentation. Such visual materials may take the form of or at least include visual aids such as shared desktops, multiple-slide presentations, and the like. In some instances, from the perspective of another attendee at the online meeting, only such visual materials are presented on the display of the online meeting, while the presenter participates only as an audio voiceover. In other instances, the presenter may be shown in one region of the display while the visual materials are shown in another. And other similar examples exist as well.

Conventional videoconferencing techniques typically employ a camera mounted at one location and directed at a user. The camera acquires an image of the user and background of the user that is then rendered on the video display of another user. The rendered image typically depicts the user, miscellaneous objects, and background that are within the field-of-view of the acquiring camera. For example, the camera may be mounted on the top edge of a video display within a conference room with the user positioned to view the video display. The camera field-of-view may encompass the user and, in addition, a conference table, chairs, and artwork on the wall behind the user, (i.e., anything else within the field-of-view). Typically, the image of the entire field-of-view is transmitted to the video display of a second user. Thus, much of the video display of the second user is filled with irrelevant, distracting, unappealing, or otherwise undesired information. Such information may diminish the efficiency, efficacy, or simply the esthetic of the videoconference. This reduces the quality of the user experience.

SUMMARY

Improvements over the above-described developments have recently been realized by technology that, among other capabilities and features, extracts what is known as a "persona" of a user from a video feed from a video camera that is capturing video of the user. This technology is described in the following patent documents, each of which is hereby incorporated by reference in its respective entirety into this disclosure: (i) U.S. patent application Ser. No. 13/083,470, entitled "Systems and Methods for Accurate User Foreground Video Extraction," filed Apr. 8, 2011 and issued Aug. 26, 2014 as U.S. Pat. No. 8,818,028, (ii) U.S. patent application Ser. No. 13/076,264, entitled "Systems and Methods for Embedding a Foreground Video into a Background Feed based on a Control Input," filed Mar. 30, 2011 and published Oct. 6, 2011 as U.S. Patent Application Pub. No. US2011/0242277, (iii) U.S. patent application Ser. No. 14/145,874, entitled "System and Methods for Persona Identification Using Combined Probability Maps," filed Dec. 31, 2013 and published Jul. 2, 2015 as U.S. Patent Application Pub. No. US2015/0187076, (iv) unpublished U.S. patent application Ser. No. 14/716,495, entitled "Methods and Systems for Assigning Pixels Distance-Cost Values Using a Flood Fill Technique," filed May 19, 2015, and (v) unpublished U.S. patent application Ser. No. 14/716,511, entitled "Methods and Systems or Identifying Background in Video Data Using Geometric Primitives," filed May 19, 2015.

The extracted persona, which in some examples appears as a depiction of the person from the torso up (i.e., upper torso, shoulders, arms, hands, neck, and head), and in other examples may be a depiction of the entire person from head to foot, may then visually combined by this technology with various other video content. In various different instances, one person may have the role of a presenter, or multiple people may participate in a panel type discussion, a meeting, or even a simple chat session, where each person may be at a separate location. In some instances, the persona(s) are combined with content such as a multiple-slide presentation, such that, e.g., the presenter appears to the attendees at the online meeting to be superimposed over the content, thus personalizing and otherwise enhancing the attendees' experiences.

As mentioned, this persona extraction is carried out with respect to video data that is being received from a camera that is capturing video of a scene in which the user is positioned. The persona-extraction systems and methods may substantially continuously (e.g., with respect to each frame) identify which pixels represent the user and which pixels do not.

Disclosed herein are methods and systems for real-time user extraction using deep learning networks. In some embodiments, the methods and systems for user extraction use erosion and flood-fill operations. In at least one embodiment, due to iterative processes, persona extraction can be accomplished for many frames without requiring image-depth data for the respective frames.

In one embodiment, the process relates to an ongoing video stream. The process includes obtaining a first frame of color pixel data. The process also includes checking whether a reset flag is cleared or set at a first time. The process also includes generating a trimap for the first frame. If the reset flag is cleared at the first time, generating the trimap for the first frame comprises obtaining a user-extraction contour that is based on an immediately preceding frame, and generating the trimap for the first frame based on the obtained user-extraction contour. The process also includes outputting the generated trimap for use in extracting a user persona from the first frame.

In one embodiment, the process relates to an ongoing video stream. The process also includes checking whether a reset flag is cleared or set at a first time. The process also includes generating a trimap for the first frame. If the reset flag is set at the first time, generating the trimap for the first frame comprises detecting at least one persona feature in the first frame. Generating the trimap also comprises generating an alpha mask at least in part by aligning an intermediate persona contour with the detected at least one persona feature, wherein the intermediate persona contour is based on a result of a color-based flood-fill operation having been performed on a previous frame of color pixel data that had been segmented by a deep-learning-network-based segmentation (DNNS) process. The trimap is then generated for the first frame based on the generated alpha mask. The process also includes outputting the generated trimap for use in extracting a user persona from the first frame.

In some embodiments, generating the trimap based on the obtained user-extraction contour or generated alpha mask comprises performing an erosion operation inward from the contour or mask and performing a dilation operation outward from the contour or mask.

In some embodiments, aligning the intermediate persona contour with the detected at least one persona feature comprises at least one of scaling and translating the intermediate persona contour to fit the detected at least one persona feature.

In one embodiment, the at least one persona feature may comprise a user face. In another embodiment, the at least one persona feature may comprise at least one of eyes, hair, ears, nose, mouth, and/or the like. In another embodiment, the persona feature points may be related to specific feature points from the intermediate persona contour, such that the intermediate persona contour may be mapped to fit the corresponding location(s) (and size(s)) of the related feature points in the current frame.

In some embodiments, after generating the trimap, the process also includes evaluating at least one reset condition. If at least a predefined subset of the at least one reset condition is true, the process may also include responsively setting the reset flag for a following frame. If each of the at least one reset condition is true, the process may also include responsively communicating an MLS request to the MLS process. In some embodiments, the at least one reset condition includes: (i) an elapsed time from a previous MLS request being greater than a time threshold; (ii) a difference between a post-core segmentation user-extraction contour for the first frame and the intermediate persona contour exceeding a difference threshold; (iii) a level of motion in the first frame exceeding a motion threshold; and iv) at least one user being detected in the first frame. In some embodiments, the predefined subset includes reset conditions (i) and (ii). In some embodiments, the predefined subset consists of reset conditions (i) and (ii). In some embodiments, the MLS request specifies the first frame as an input to the MLS process.

In some embodiments, the result of an MLS request may be a new MLS process segmented frame, based on the frame resulting in the MLS request. Through a series of additional steps, the MLS request result may result in the replacement of the intermediate persona contour.

In another embodiment, the process relates to the initialization or reinitialization of a video stream. The process includes receiving a first segmented frame of color pixel data, the first segmented frame comprising an initial-segmentation persona contour that was identified by an MLS process. The process also includes defining an eroded MLS persona contour and a dilated MLS persona contour, both based on the initial-segmentation persona contour. The process includes defining an intermediate persona contour at least in part by performing a bidirectional color-based flood-fill operation outward from the eroded MLS persona contour and inward from the dilated MLS persona contour. The process includes obtaining a second frame of color pixel data from an input source (e.g., camera, etc.). The process includes detecting at least one second-frame persona feature in the second frame. The process includes generating a second-frame alpha mask at least in part by aligning the intermediate persona contour with the detected at least one second-frame persona feature. The process includes generating a second-frame trimap based on the generated second-frame alpha mask. The process includes outputting the generated second-frame trimap for use in extracting a user persona from the second frame.

In some embodiments, the eroded MLS persona contour is defined at least in part by performing an erosion operation inward from the initial-segmentation persona contour, and the dilated MLS persona contour is defined at least in part by performing a dilation operation outward from the initial-segmentation persona contour.

In some embodiments, generating the second-frame trimap comprises eroding and dilating the alpha mask to a lesser extent than is used when defining the eroded MLS persona contour and the dilated MLS persona contour for the first segmented frame.

In some embodiments, aligning the intermediate persona contour with the detected at least one second-frame persona feature comprises at least one of scaling and translating the intermediate persona contour to fit the detected at least one second-frame persona feature.

In some embodiments, the process further comprises filtering the first segmented frame to exclude pixels whose confidence level, as defined by a confidence map generated by the MLS process, falls below a confidence threshold.

In some embodiments, after generating the second-frame trimap, the process also includes evaluating at least one reset condition. If at least a predefined subset of the at least one reset condition is true, the process may also include responsively setting the reset flag for a following frame. If each of the at least one reset condition is true, the process may also include responsively communicating an MLS request to the MLS process. In some embodiments, the at least one reset condition includes: (i) an elapsed time from a previous MLS request being greater than a time threshold; (ii) a difference between a post-core segmentation user-extraction contour for the second frame and the intermediate persona contour exceeding a difference threshold; (iii) a level of motion in the second frame exceeding a motion threshold; and (iv) at least one user being detected in the second frame. In some embodiments, the predefined subset includes reset conditions (i) and (ii). In some embodiments, the predefined subset consists of reset conditions (i) and (ii). In some embodiments, the MLS request specifies the second frame as an input to the MLS process.

In some embodiments, the process further comprises obtaining a third frame of color pixel data. The process further includes checking whether a reset flag is cleared or set at a third time. The process further includes generating a third-frame trimap. If the reset flag is cleared at the third time, then generating the third-frame trimap comprises: obtaining a post-core segmentation user-extraction contour that is based on the second frame; and generating the third-frame trimap based on the obtained post-core segmentation user-extraction contour. If the reset flag is set at the third time, then generating the third-frame trimap comprises: detecting at least one third-frame persona feature in the third frame; generating a third-frame alpha mask at least in part by aligning the intermediate persona contour with the detected at least one third-frame persona feature; and generating the third-frame trimap based on the generated third-frame alpha mask. The process further includes outputting the generated third-frame trimap for use in extracting a user persona from the third frame.

In one embodiment, the systems and methods disclosed herein may take the form of an apparatus. The apparatus may comprise a communication interface. The apparatus may comprise a processor. The apparatus may comprise non-transitory, computer readable data storage containing instructions executable by the processor for causing the apparatus to carry out a set of functions, the set of functions comprising any or all of the previous described processes.

The above overview is provided by way of example and not limitation, as those having ordinary skill in the relevant art may well implement the disclosed systems and methods using one or more equivalent components, structures, devices, and the like, and may combine and/or distribute certain functions in equivalent though different ways, without departing from the scope and spirit of this disclosure.

BRIEF DESCRIPTION OF THE DRAWINGS

A more detailed understanding may be had from the following description, which is presented by way of example in conjunction with the following drawings, in which like reference numerals are used across the drawings in connection with like elements.

FIG. 5 illustrates a block diagram of a user extraction region process/module, in accordance with one embodiment.

DETAILED DESCRIPTION

The systems and methods disclosed herein are generally directed to user (e.g., user persona) extraction from a video stream. In some embodiments, the systems and methods assume the existence of an alpha mask (e.g., persona contour) from a previous frame, and then utilize a sequence of a shrinking (e.g., erosion) operation followed by a color-based flood fill operation to define an alpha mask (e.g., persona contour) for the current frame. Various further embodiments for identifying an initialized (or reinitialized) persona contour are also disclosed herein.

Figure 1:
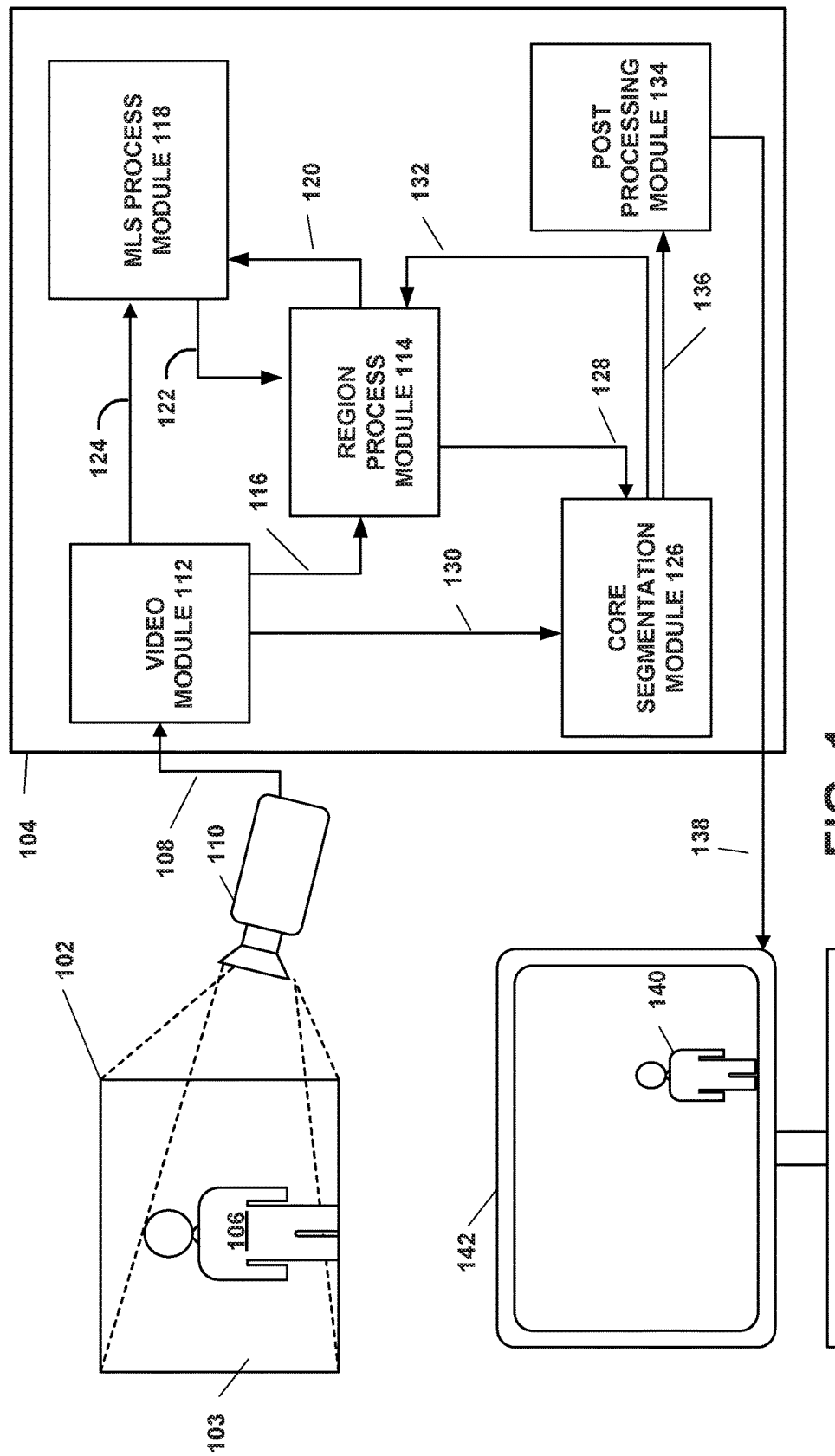
FIG. 1 depicts an image capture and persona-processing apparatus, in accordance with at least one embodiment.

FIG. 1 depicts a camera 110 capturing an image of scene 102 that includes a person 106 and her surroundings 103. The camera 110 may provide image data over connection 108 to a computing device 104. The image data may include frames of image pixel data. Image pixel data may comprise color pixel data. The camera 110 may be an external peripheral device, such as one connected via a Universal Serial Bus (USB) connection or the like, or may be more highly-integrated into computing device 104.

In some embodiments, the camera may be configured to capture depth information related to the image 102. Such depth information may or may not be communicated to the computing device 104. However, depth information in not required for the herein disclosed methods and systems to function.

Computing device 104 may take the form of a desktop computer, laptop computer, tablet computer, smart phone, or the like. In the embodiment shown in FIG. 1, it includes a video module 112, a region process module 114, a machine-learning-segmentation (MLS) process module 118, a core segmentation module 126, and a post processing module 134 (optional). The computing device 104 may then provide a video output over communication link 138 for display on a display device 142. The video output includes image data of a persona 140 representative of the person 106, but without the background image data associated with the background 103 from the scene 102.

The preceding paragraph is an example of the fact that, in the present disclosure, various elements of one or more of the described embodiments are referred to as modules that carry out (i.e., perform, execute, and the like) various functions described herein. As the term "module" is used herein, each described module includes hardware (e.g., one or more processors, microprocessors, microcontrollers, microchips, application-specific integrated circuits (ASICs), field programmable gate arrays (FPGAs), memory devices, and/or one or more of any other type or types of devices and/or components deemed suitable by those of skill in the relevant art in a given context and/or for a given implementation. Each described module may also include instructions executable for carrying out the one or more functions described as being carried out by the particular module, where those instructions could take the form of or at least include hardware (i.e., hardwired) instructions, firmware instructions, software instructions, and/or the like, stored in any non-transitory computer-readable medium deemed suitable by those of skill in the relevant art.

Again with respect to FIG. 1, video module 112 may include a video driver module to communicate with the camera 110. It may be configured to provide image data received from the camera 110 to the MLS process module 118 via connection 124. Such a data transfer may be performed by the use of data memory storage devices as is known in the art. Similarly, image pixel data representative of the scene 102 may be conveyed to the region process module 114 by connection 116 and to core segmentation module 126 as shown by connection 130.

Figure 9:
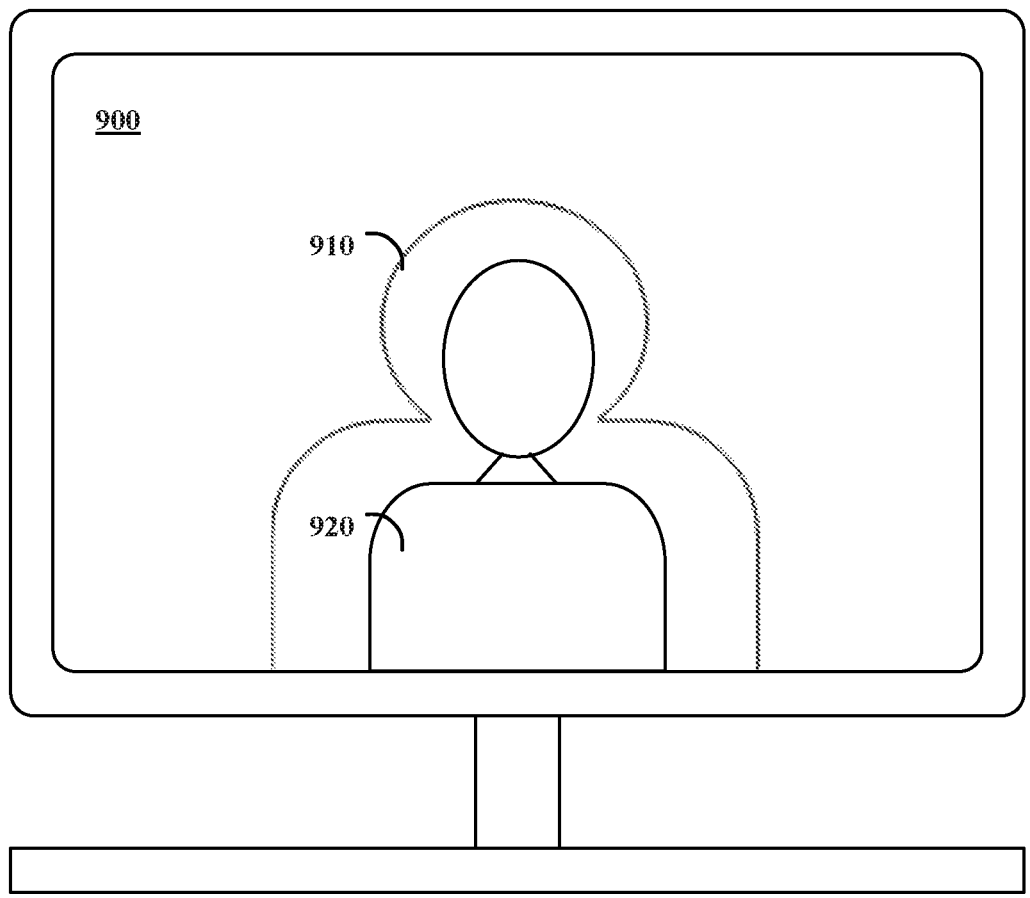
FIG. 9 depicts an exemplary displayed avatar template for an avatar fitting process, in accordance with at least one embodiment.

In some embodiments, the video module may also obtain an initialized persona contour for the current frame of image data, as discussed below in relation to FIG. 9.

In some embodiments, contours may comprise "alpha masks" which identify the pixel locations belonging to a desired persona (e.g., user). A given alpha mask may take the form of or at least include an array with a respective stored data element corresponding to each pixel in the corresponding frame, where such stored data elements are individually and respectively set equal to 1 (one) for each user pixel and to 0 (zero) for every other pixel (i.e., for each non-user (a.k.a. background) pixel).

The described alpha masks correspond in name with the definition of the "A" in the "RGBA" pixel-data format known to those of skill in the art, where "R" is a red-color value, "G" is a green-color value, "B" is a blue-color value, and "A" is an alpha value ranging from 0 (complete transparency) to 1 (complete opacity). In a typical implementation, the "0" in the previous sentence may take the form of a hexadecimal number such as 0x00 (equal to a decimal value of 0 (zero)), while the "1" may take the form of a hexadecimal number such as 0xFF (equal to a decimal value of 255); that is, a given alpha value may be expressed as an 8-bit number that can be set equal to any integer that is (i) greater than or equal to zero and (ii) less than or equal to 255. Moreover, a typical RGBA implementation provides for such an 8 bit alpha number for each of what are known as the red channel, the green channel, and the blue channel; as such, each pixel has (i) a red ("R") color value whose corresponding transparency value can be set to any integer value between 0x00 and 0xFF, (ii) a green ("G") color value whose corresponding transparency value can be set to any integer value between 0x00 and 0xFF, and (iii) a blue ("B") color value whose corresponding transparency value can be set to any integer value between 0x00 and 0xFF. And certainly other pixel-data formats could be used, as deemed suitable by those having skill in the relevant art for a given implementation.

When merging an extracted persona with content, the disclosed methods and/or systems may create a merged display in a manner consistent with the related applications previously cited; in particular, on a pixel-by-pixel (i.e., pixel-wise) basis, the merging is carried out using pixels from the captured video frame for which the corresponding alpha-mask values equal 1, and otherwise using pixels from the content.

In some embodiments, the systems and methods disclosed herein may generate a trimap of the image or frame. Generally, as used herein, a trimap may define a background region (e.g., non-user and/or alpha value of 0), a foreground region (e.g., user and/or alpha value of 1), and an unclear region (e.g., to be divided between foreground and background) of a frame of pixel data. Depending on the embodiment, generated trimaps may be based at least in part upon erosion and dilation operations performed on alpha masks and/or contours.

Figure 2:
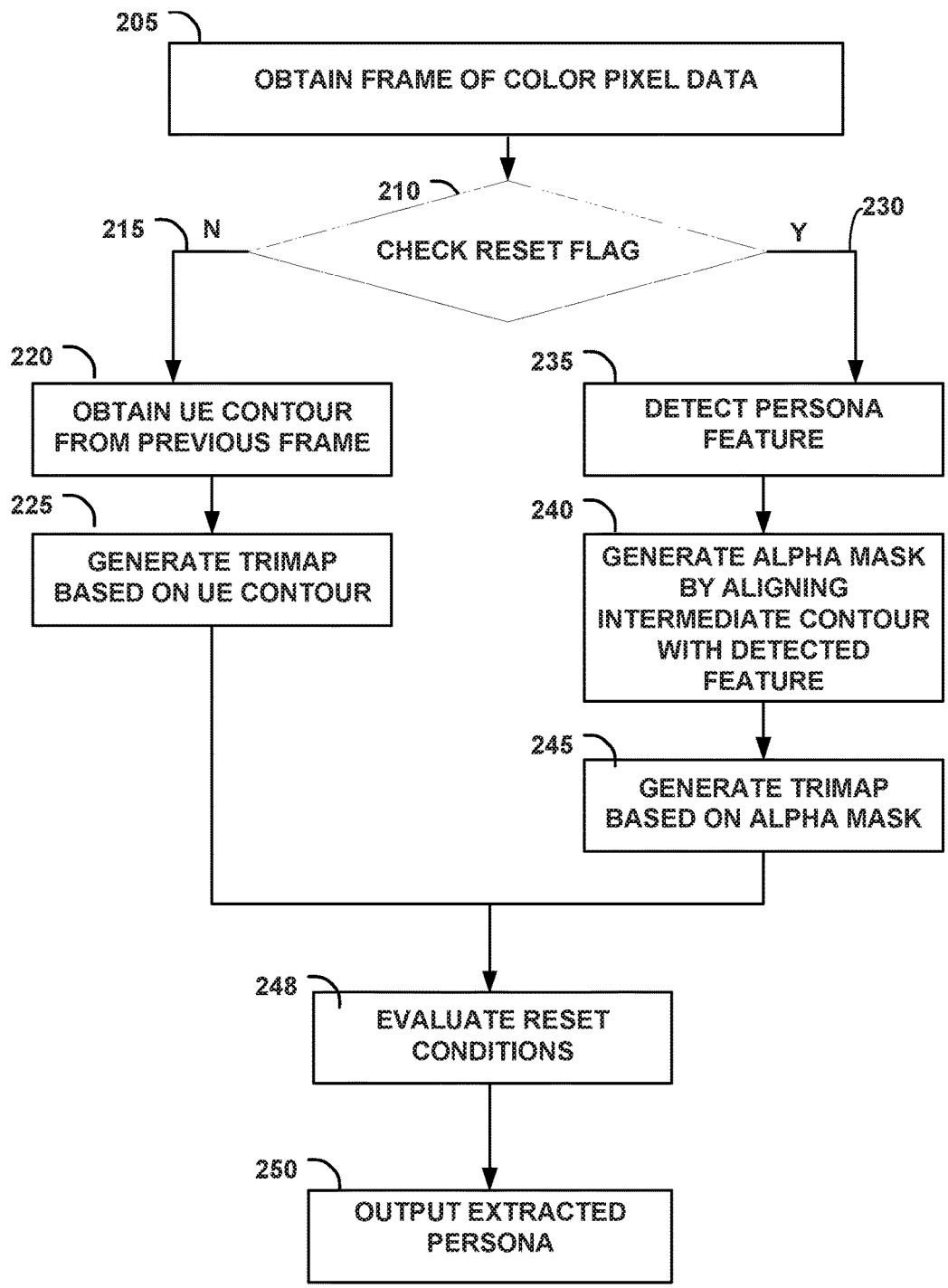
FIG. 2 depicts an exemplary method of persona extraction, in accordance with at least one embodiment.

One embodiment of the systems and methods disclosed herein takes the form of a process 200, as depicted in FIG. 2. The process includes obtaining a first frame of color pixel data 205. The process also includes checking whether a reset flag is cleared or set at a first time 210. The process also includes generating a trimap for the first frame. If the reset flag is cleared at the first time 215, then generating the trimap for the first frame comprises: obtaining a user-extraction contour that is based on an immediately preceding frame 220; and generating the trimap for the first frame based on the obtained user-extraction contour 225. If the reset flag is set at the first time 230, then generating the trimap for the first frame comprises: detecting at least one persona feature in the first frame 235; generating an alpha mask at least in part by aligning an intermediate persona contour with the detected at least one persona feature 240, wherein the intermediate persona contour is based on a result of a color-based flood-fill operation having been performed on a previous frame of color pixel data that had been segmented by a machine-learning-segmentation (MLS) process; and generating the trimap for the first frame based on the generated alpha mask 245. The process also includes outputting the generated trimap for use in extracting a user persona from the first frame 250.

In some embodiments, the generated trimaps may be output to a core segmentation module for additional processing, and for generating the user-extraction (UE) contour for the current frame. In some embodiments, the generated UE contour may be communicated back to or accessible by the process, such as for use in the processing of the next frame (e.g., if communicated back to process after UE contour generation), or for use in checking reset conditions.

In some embodiments, aligning the intermediate persona contour with the detected at least one persona feature (e.g., 240) comprises at least one of scaling and translating the intermediate persona contour to fit the detected at least one persona feature.

In some embodiments, generating the trimap based on the obtained user-extraction contour (225) or generated alpha mask (245) comprises performing an erosion operation inward from the contour or mask and performing a dilation operation outward from the contour or mask. Such operations are discussed more fully in relation to FIG. 7 below.

In some embodiments, after generating the trimap (e.g., 225 or 245), the process 200 also includes evaluating at least one reset condition 248. If at least a predefined subset of the at least one reset condition is true, the process may also include responsively setting the reset flag for a following frame. If each of the at least one reset condition is true, the process may also include responsively communicating an MLS request to the MLS process. In some embodiments, the at least one reset condition includes: (i) an elapsed time from a previous MLS request being greater than a time threshold; (ii) a difference between a post-core segmentation user-extraction contour for the first frame and the intermediate persona contour exceeding a difference threshold; (iii) a level of motion in the first frame exceeding a motion threshold; and (iv) at least one user being detected in the first frame. In some embodiments, the predefined subset includes reset conditions (i) and (ii). In some embodiments, the predefined subset consists of reset conditions (i) and (ii). In some embodiments, the MLS request specifies the first frame as an input to the MLS process.

In some embodiments, the result of an MLS request may be a new MLS process segmented frame, based on the frame resulting in the MLS request. Through a series of additional steps, the MLS request result may result in the replacement of the intermediate persona contour.

Figure 3:
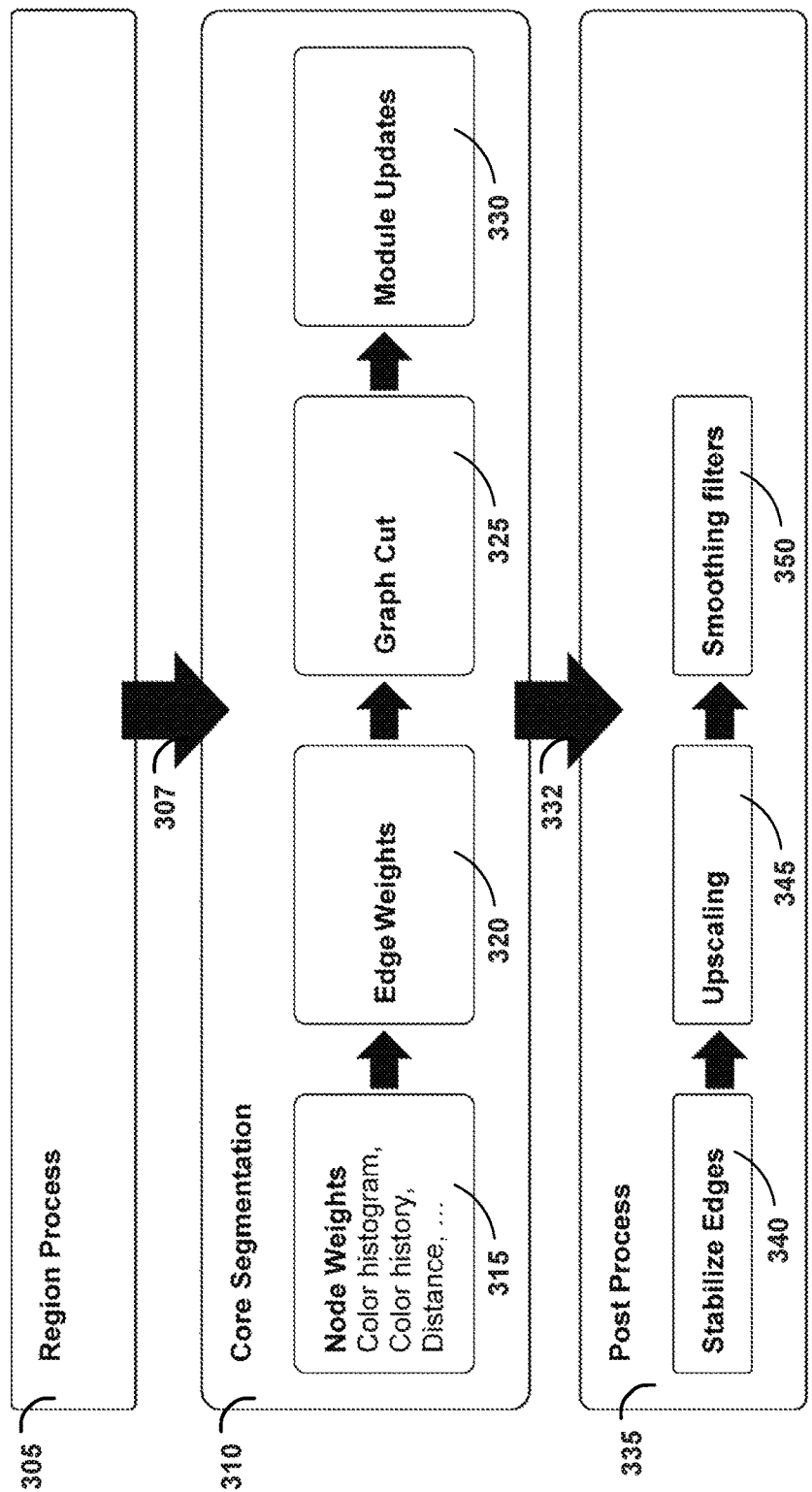
FIG. 3 illustrates an algorithm flow diagram for an embodiment of user extraction.

In one embodiment, a 2D user extraction algorithm main flow 300 may be as illustrated in FIG. 3. A region process/module 305 (see further in FIG. 5) processes frames of color pixel data and generates trimaps for those frames. Once processed, the frames and generated trimaps for the frames are passed 307 to a core segmentation process/module 310 which may utilize the generated trimaps to perform user extraction from the frames. After the core segmentation, the extracted user contours may be passed 332 to a post processing module 335.

In some embodiments, the core segmentation 310 may operate a variety of sub-processes for user extraction, such as, but not limited to: node weights 315, edge weights 320, graph cut 325, module updates 330, and/or the like.

In some embodiments, the node weights 315 may further comprise generating a foreground color histogram based on colors of the pixels in the generated trimaps; generating a background color histogram based on colors of the pixels the generated trimaps; and wherein a foreground-background probability map (e.g., one factor in node weights) is based at least in part on the relative occurrence of the colors of the respective pixels in the generated foreground and background color histograms. In some embodiments, node weights 315 may further comprise distance factors In one embodiment, node weights 315 may be based at least in part on a color factor (e.g., color change from a seed pixel). For example, the greater the color difference between a pixel under analysis and a seed pixel, the more likely it is that that pixel is in the background. In one embodiment, node weights 315 may be based at least in part on a color history for a particular pixel. In one embodiment, the node weights 315 may be based at least in part on a distance factor (e.g., pixel distance from a seed pixel). For example, in one embodiment, the greater distance a pixel under analysis is from a seed pixel, the more likely it is that that pixel is in the background. In some embodiments, the "weights" for pixels may be alpha values between 0 and 1 (e.g., values closer to 0 have higher probability of being background, values closer to 1 have higher probability of being background), and/or the like. In other embodiments other weighting or probability approaches may be utilized (such as the log-likelihood ratios discussed above), as known in the art. Edge weights 320 may be established at least in part from the node weights 315.

In one embodiment, the graph cut sub-process 325 may be a graph cut utility (such as what is available from within the OpenCV library) used to segment the pixels in an unclear region of a trimap into foreground and background, for example using the node weights 315 and/or the edge weights 320. In some embodiments, the segmentation of the persona extraction may be formulated as a mincut/maxflow problem. In this case, the image is mapped into a graph, and each pixel is mapped to a node. In addition, there are two additional special nodes called the source and the sink. The node for each image pixel is connected to both the source and the sink. If a probability map (or aggregate map) indicates that that pixel is likely to be foreground, a weight is applied to the edge linking the pixel to the source. If a probability map (or aggregate map) indicates that that pixel is likely to be background, a weight is applied to the edge linking the pixel to the sink. The magnitude of the weight increases as the probability becomes more certain. In addition, edges are included that link the nodes for a pixel to the nodes of a neighboring pixel. The weights of these nodes are inversely proportional to the likelihood of a boundary appearing there. One possible technique is to set these weights to be large if the two pixels are similar in color and set them to be small if the two pixels are not. Thus, transitioning from foreground to background is favored in areas where the color is also changing. The mincut problem is then solved by configuring the algorithm to remove edges from the graph until the source is no longer connected to the sink. (The algorithm will minimize the total weight of the edges it removes.) Since the node for each pixel is connected to both the source and the sink, one of those edges must be removed by the cut. If the node remains connected to the source (the edge to the sink was removed), that pixel is marked as foreground (e.g., alpha value of 1). Otherwise, the node is connected to the sink (the edge to the source was removed), and that pixel is marked as background (e.g., alpha value of 0). The formulation described may be solved efficiently through a variety of techniques.

In some embodiments, after a graphcut (e.g., user persona extraction), module updates 330 may occur. In one embodiment, module updates may include communicating the UE contour back to the region process module 305. In other embodiments, module updates may include updates to models for node weights, background history models, color models, and/or the like, based on the results of the graph-cut. By these module updates, models may remain up-to-date and may be used efficiently for subsequent frames.

In some embodiments, the post processing module 335 may operate a variety of sub-processes for improving an extracted user persona/contour, including but not limited to: edge stabilization 340, upscaling 345, smoothing filters 350, and/or the like as known to those of ordinary skill in the art.

In some embodiments, one or more sub-processes may be located in different modules, there may be fewer or additional modules, modules may be combined, and/or the like.

Figure 4:
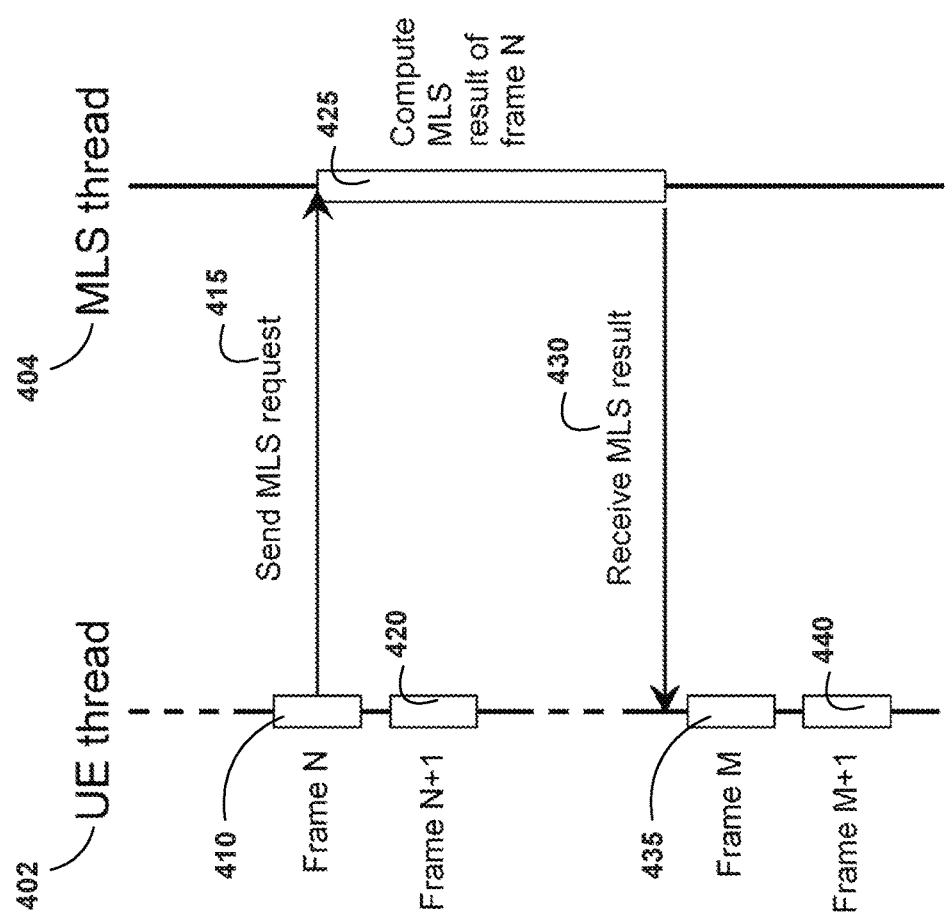
FIG. 4 illustrates an embodiment of a message sequence between a user extraction thread/process and a machine-learning-segmentation thread/process.

FIG. 4 illustrates one embodiment of the interaction between a UE thread 402 (e.g., region process) and an MLS thread or process 404.

The MLS thread 404 may receive input data from an MLS request within a UE thread 402. From the input data (e.g., a frame of color pixel data), the MLS thread may run a machine learning based segmentation to generate an MLS result (e.g., a segmented image). In one embodiment, the MLS thread may use a deep neural network (DNN) machine learning process, such as a fully convolutional network (FCN). For example, FCN is more fully discussed in J. Long, E. Shelhamer, and T. Darrell., "Fully convolutional networks for semantic segmentation", in *IEEE CVPR*, 2015. Another form of machine learning process, using recurrent neural networks, is discussed in S. Zheng et al., "Conditional Random Fields as Recurrent Neural Networks," 2015 *IEEE International Conference on Computer Vision (ICCV)*, Santiago, 2015, pp. 1529-1537. In some embodiments, an MLS process is "trained" offline for pixel-level labelling tasks, and adapted for semantic image segmentation. In some embodiments, an MLS process may comprise a combination of a plurality of MLS-subprocesses. For example, the MLS process may comprise a segmentation process using one or several deep learning networks.

In some embodiments, the MLS process receives as input a frame of color pixel data. The input frame may be received from a UE process or thread, from a video module, or the like, as examples. In some embodiments, the MLS process operates on the received frame of color pixel data to generate an MLS segmented image, where the MLS process has identified at least one contour related to at least one person in the frame. In some embodiments, such an MLS contour takes the form of or at least includes an alpha mask associated with the frame. In other embodiments, the result of the MLS process includes a data element indicating a single label (e.g., background, person, car, chair, sofa, etc.) for each pixel in the frame. In some embodiments, only labels indicating "person" are retained for defining the MLS contour(s), or the like. And certainly other examples could be listed here as well and are known to those having skill in the art with respect to the inputs to and outputs from MLS processes.

As shown in FIG. 4, the UE thread 402 may be operating on an ongoing video stream. At some point, the UE thread 402 may process a frame N 410, which triggers an MLS request 415 (e.g., request for new MLS process segmented image). The MLS request 415 may be sent to the MLS thread 404, where the MLS request may include the frame N of color pixel data for processing by the MLS thread. The UE thread 402 may continue operating, such as on a next frame N+1 420. The MLS thread 404 may perform the segmentation of frame N 425, such as by a deep neural network (DNN) image segmentation process, or other machine learning image segmentation algorithm or process, as known to those of ordinary skill in the relevant art. While the MLS thread 404 is processing frame N, the UE thread 402 may continue processing additional frames of color pixel data, such as the frame N+1 420. At some later time, the UE thread 402 has continued processing frames of color pixel data, and receives the MLS result 430 from the MLS thread 404. In some embodiments, the processing, such as by the MLS thread, may take various times depending on the GPU, CPU, and/or the like of the system. For example, in one case, on a desktop with a strong GPU, processing may take approximately 100-300 ms, or the like. In one case, on a laptop with a GPU, processing may take approximately 500 ms to 2.5 seconds, or the like. Other time frames for processing may exist depending on the particular system in use.

In one embodiment, the result from the MLS thread is a fully processed intermediate persona contour. In one embodiment, the result from the MLS thread is a segmented image, which may be further processed within the region process of FIG. 5 to generate an intermediate persona contour.

Once received, the UE thread 402 may update a stored MLS result with the new MLS result 430, and next process a frame M of color pixel data 435. In some embodiments, a reset flag for a next frame may be set based on the receipt of the MLS result. The new MLS result 430 may be utilized by the UE thread, and processing may continue on with a frame M+1 440, etc. The handling of a newly received MLS result 430 is further discussed in relation to FIG. 5.

FIG. 5 illustrates one embodiment of a region process, as in FIG. 3. In one embodiment, the process 500 relates to an ongoing video stream. The process includes obtaining a first frame of color pixel data 505. The process also includes checking whether a reset flag is cleared or set 510. The process also includes generating a trimap for the first frame. If the reset flag is cleared 512, generating the trimap for the first frame comprises applying a UE contour 515. In one embodiment, applying a UE contour 515 comprises obtaining a user-extraction contour based on an immediately preceding frame (e.g., output of core segmentation from the immediately preceding frame), and generating the trimap for the first frame based on the obtained user-extraction contour. In some embodiments, generating the trimap based on the obtained user-extraction contour comprises performing an erosion operation inward from the obtained user extraction contour and a dilation operation outward from the obtained user extraction contour. In some embodiments, the extent of erosion and dilation is less than that for generating the intermediate persona contour from the MLS result. In some embodiments, the process may include evaluating at least one reset condition 520, discussed further below. The process also includes outputting the generated trimap for use in user persona extraction from the first frame 525.

In one embodiment, the process 500 relates to an ongoing video stream. The process includes obtaining a first frame of color pixel data 505. The process also includes checking whether a reset flag is cleared or set 510. The process also includes generating a trimap for the first frame. If the reset flag is set 534, generating the trimap for the first frame may comprise applying an intermediate persona contour to the first frame 535. The intermediate persona contour 555 is based at least in part on a result of a color-based flood-fill operation having been performed on a previous frame of color pixel data that had been segmented by a machine-learning process. In some embodiments, applying the intermediate persona contour 535 to the first frame may comprise detecting at least one persona feature in the first frame. An alpha mask may be generated at least in part by aligning the intermediate persona contour 555 based on the detected at least one persona feature. In some embodiments, aligning the intermediate persona contour with the detected at least one persona feature in the first frame may comprise at least one of scaling and translating the intermediate persona contour to fit the detected at least one persona feature in the first frame. Such scaling and/or translating may be based on the relative location and size between the detected at least one persona feature in the first frame and at least one feature in the MLS result underlying the intermediate persona contour. In some embodiments, generating the trimap comprises performing an erosion operation inward from the generated alpha mask and a dilation operation outward from the generated alpha mask. In some embodiments, the extent of erosion and dilation is less than that for generating the intermediate persona contour from the MLS result. In some embodiments, the process may include evaluating at least one reset condition 520, discussed further below. The process also includes outputting the generated trimap for use in user persona extraction from the first frame 525.

In some embodiments, detection of at least one persona feature in a frame may be carried out at least in part using methods known to those of ordinary skill in the art. For example, where the persona feature may comprise a user face, detection may comprise the use of combinations of genetic algorithms and Eigen-face techniques, Google Vision or Mobile Vision APIs, the FaceRecognizer operations within OpenCV, and/or the like.

In some instances, it may occur that no persona feature is detected. In such instances, the processing may revert to applying the user-extraction contour 515, as if the reset flag had not been set. And certainly other example implementations could be listed here.

Figure 7:
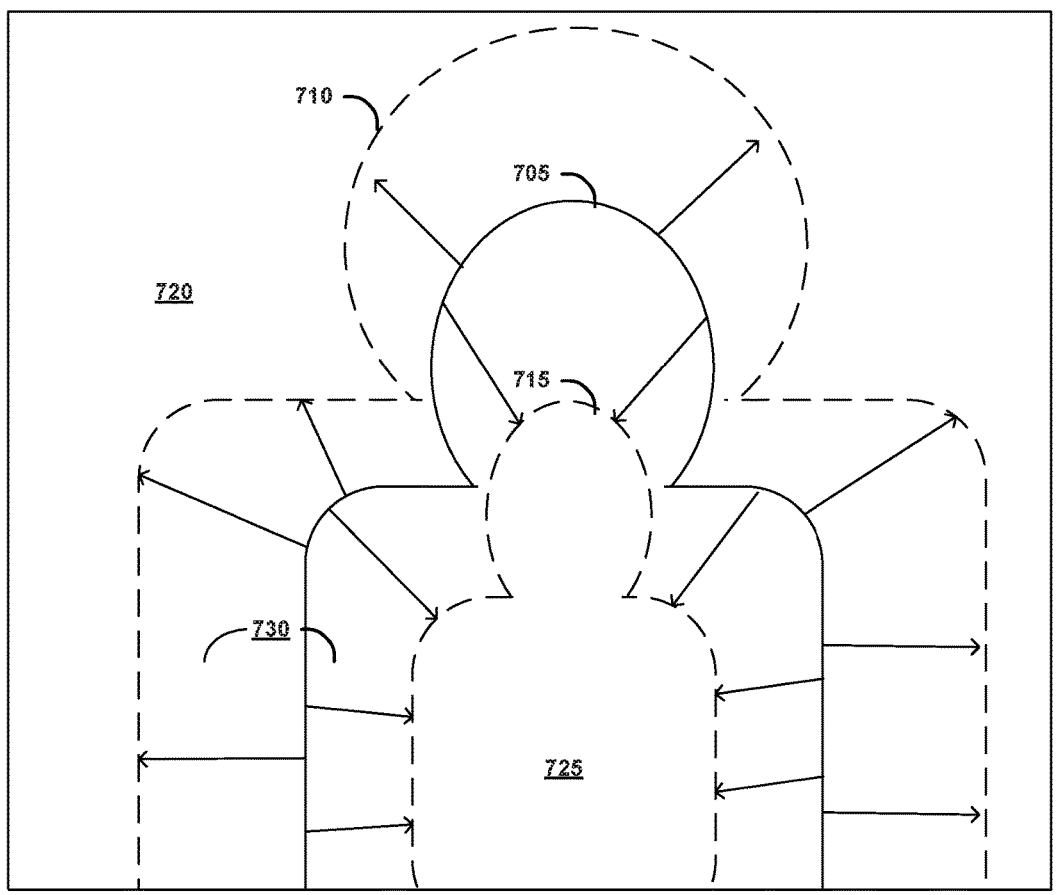
FIG. 7 illustrates operation of erosion and dilation operations, in accordance with one embodiment.

Examples of the erosion and dilation operations are illustrated in FIG. 7. In one embodiment, an erosion operation may be performed based at least in part on the contour and/or mask to "shrink" the contour and/or mask and establish a high certainty foreground region (e.g., alpha value of 1 region). As shown in FIG. 7, the contour and/or mask 705 may be dilated to a dilated contour/mask 710, and eroded to an eroded contour/mask 715. The area outside the dilated contour/mask 710 may define a background region 720 of the generated trimap. The area inside the eroded mask/contour 715 may define a foreground region 725 of the generated trimap. The area between the dilated contour/mask 710 and eroded contour/mask 715 may define the unknown region 730 of the generated trimap.

In one embodiment, the contour and/or mask 705 may be eroded by a predefined number of pixels. In some embodiments, the contour/mask 705 may be eroded by a percentage of the pixels in the frame, a percentage of pixels related to the contour/mask 705, and/or the like. In one embodiment, the contour/mask 705 may be eroded by a percentage of the area of the reference contour (e.g., area of initial estimate of user persona in current frame). In some embodiments, the erosion operation may be a utility, such as what is available from within the OpenCV library.

In some embodiments, the dilation operation may be a utility, such as what is available from within the OpenCV library. In one embodiment, the contour/mask 705 may be dilated by a predefined number of pixels. In some embodiments, the contour/mask 705 may be dilated by a percentage of the pixels in the frame, a percentage of pixels related to the contour/mask 705, and/or the like. In one embodiment, the contour/mask 705 may be dilated by a percentage of the area of the contour/mask 705 (e.g., an initial estimate of user persona in current frame).

In some embodiments, after generating the trimap, the process also includes evaluating at least one reset condition 520. If at least a predefined subset of the at least one reset condition is true, the process may also include responsively setting the reset flag for a following frame 530. If each of the at least one reset condition is true, the process may also include responsively communicating an MLS request to the MLS process 534. In some embodiments, the at least one reset condition includes: i) an elapsed time from a previous MLS request being greater than a time threshold; ii) a difference between a post-core segmentation user-extraction contour for the first frame and the intermediate persona contour exceeding a difference threshold; iii) a level of motion in the first frame exceeding a motion threshold; and iv) at least one user being detected in the first frame. In some embodiments, the predefined subset includes reset conditions i) and ii). In some embodiments, the predefined subset consists of reset conditions i) and ii). In some embodiments, the MLS request specifies the first frame as an input to the MLS process.

In some embodiments, the result of an MLS request may be a new MLS process segmented frame, based on the frame resulting in the MLS request. Through a series of additional steps, the MLS request result may result in the replacement of the intermediate persona contour.

In another embodiment, the process 500 relates to the initialization or reinitialization of a video stream. Depending on the particular scenario, the process includes receiving a segmented first frame of color pixel data from an MLS thread 540, and updating an MLS result 545. The process may also include setting a reset flag for a next frame 547 after updating the MLS result 545.

The updated MLS result 545 is used to update or generate an intermediate persona contour 555. The intermediate persona contour 555 is based at least in part on a result of a color-based flood-fill operation having been performed on the MLS result, where the MLS result is a frame of color pixel data that had has been segmented by a machine-learning process in the MLS thread or process (e.g., MLS process module 118 In FIG. 1, MLS thread 404 in FIG. 4). For example, in some embodiments, the MLS result 545 may comprise an alpha mask layer or other data object identifying an initial-segmentation persona contour.

In some embodiments, once the MLS result is updated (545), a generation and/or refining process 550 on such MLS result may occur. For example, the system or process may detect at least one persona feature in the updated MLS result (e.g., the RGB or RGBA frame that is used to compute the intermediate persona contour 555), such as for later use in the process.

Figure 6A:
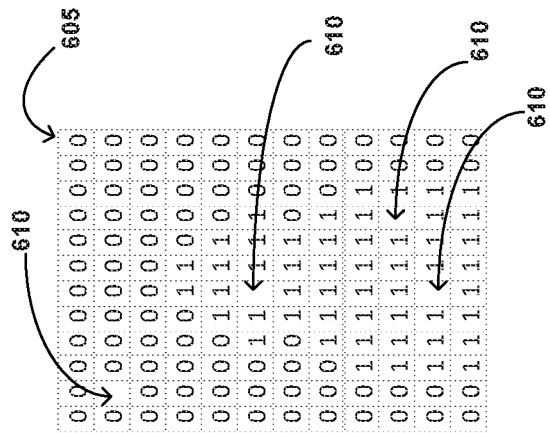
FIGS. 6A and 6B illustrate exemplary contours/alpha masks, in accordance with some embodiments.
Figure 6B:
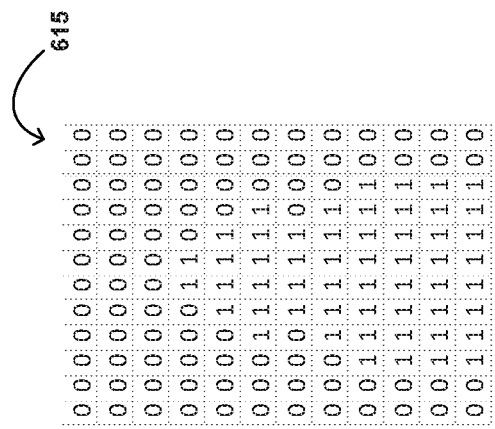

In some embodiments, the generation/refining process 550 further comprises filtering the MLS process segmented frame (e.g., MLS result) to exclude pixels whose confidence level, as defined by a confidence map (which may be generated as a byproduct by the particular algorithm used in the MLS process, and shows a confidence level of the algorithm in labeling a pixel as user/foreground or non-user/background), falls below a confidence threshold. In some embodiments, the confidence thresholding may result in "blobs" of unassigned pixels within foreground regions or background regions. For example, as in FIG. 6A, an exemplary initial-segmentation persona contour may be defined by an alpha mask 605, and after confidence thresholding certain pixels 610 may be unassigned. In some embodiments, one or more refining techniques, such as connected components or the like, may be utilized to address such "blobs," for example by replacing surrounded unassigned pixels 610 with a foreground or background label in line with their surroundings, with a result such as shown in exemplary refined alpha mask 615 of FIG. 6B.

After one or more refining or other process steps, the initial-segmentation persona contour may be used for generating a trimap, such as by a combination erosion and dilation process, as discussed above in relation to FIG. 7. In some embodiments, this may include defining an eroded MLS persona contour and a dilated MLS persona contour, both based on the initial-segmentation persona contour. In some embodiments, this may comprise eroding and/or dilating the initial-segmentation persona contour by a greater extent than when erosion and dilation are used in applying the user-extraction contour or intermediate persona contour to a current frame (as in steps 515 and 535) (e.g., by additional pixels, etc.).

Figure 8:
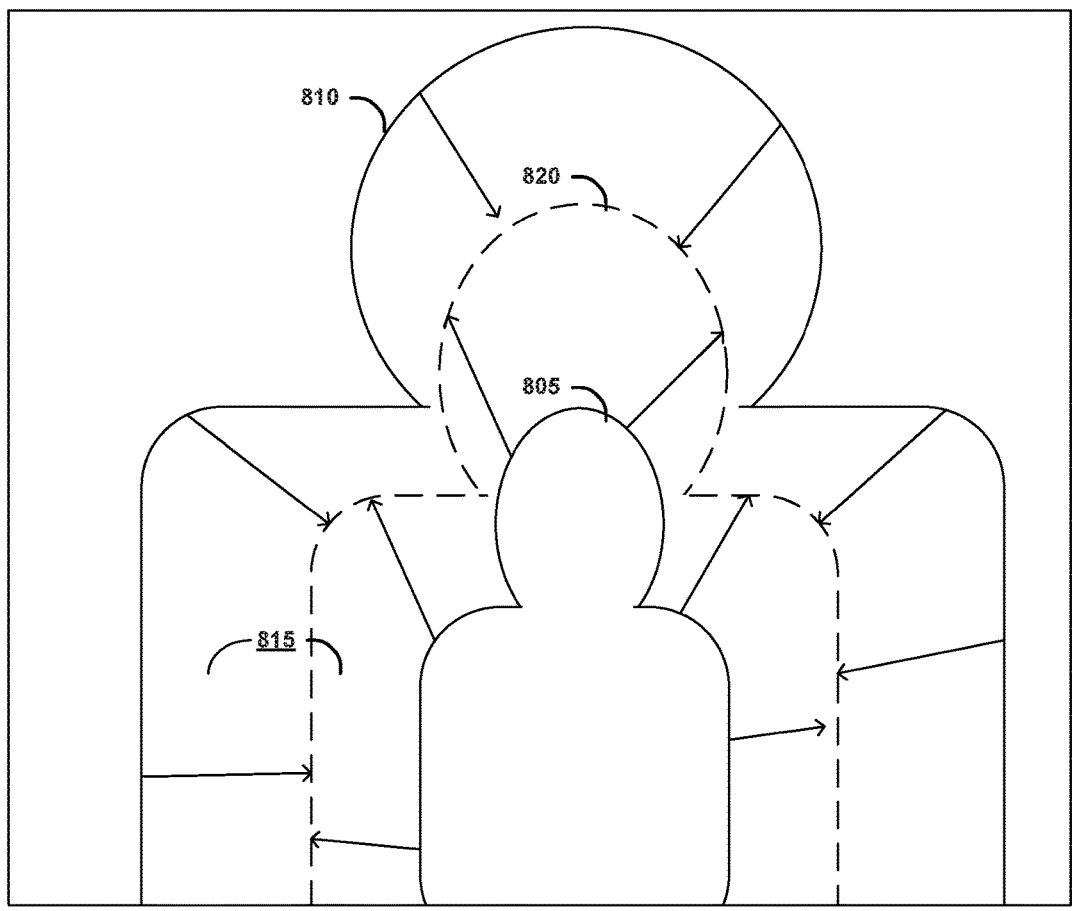
FIG. 8 illustrates operation of a bi-directional color-based flood-fill operation, in accordance with one embodiment.

Further steps of generating the intermediate persona contour are set forth in relation to FIG. 8. The erosion and dilation steps set forth in relation to FIG. 7 may be used to generate the eroded MLS persona contour 805 and dilated MLS persona contour 810 of FIG. 8, as well as an unclear region 815 between contours 805 and 810. In some embodiments, in relation to the MLS initial-segmentation persona contour, the erosion and dilation operations may comprise eroding and dilating the initial-segmentation persona contour to a greater extent than when using the erosion and dilation operations to generate trimaps from the user-extraction contour or intermediate persona contour as in 515 and 535. Defining the intermediate persona contour 820 may comprise performing a bidirectional color-based flood-fill operation outward from the eroded MLS persona contour 805 and inward from the dilated MLS persona contour 810, which labels the unclear region 815 as foreground or background pixels.

In some additional embodiments, such as for initializing user extraction from a video stream, an avatar-fitting process, or the like (e.g., steps 560, 565). For example, in one embodiment, a user may press a button or key to initiate a fitting process 560. In one embodiment, the user may be prompted to align their captured image with a silhouette overlaid on a displayed image frame. In some embodiments, the user may be prompted to confirm when they have aligned with the silhouette 565. A reference contour may then be obtained based at least in part on the silhouette, and this reference contour then used to generate an intermediate persona contour 555, such as through similar generation/refining steps as discussed above in relation to step 550. With reference to FIG. 9, a generic outline (or avatar outline) 910 may be displayed on a screen 900 of the user's device. The user may align their video image 920, displayed on their device, with the outline/template 910, and when aligned may indicate general alignment (e.g., hit a key, etc.).

In some embodiments, an alternative erosion and dilation operation may be utilized in the avatar fitting process (e.g., a stronger shrink), for example to estimate a user offset from the template (either extending outside template or too small within template).

Figure 10:
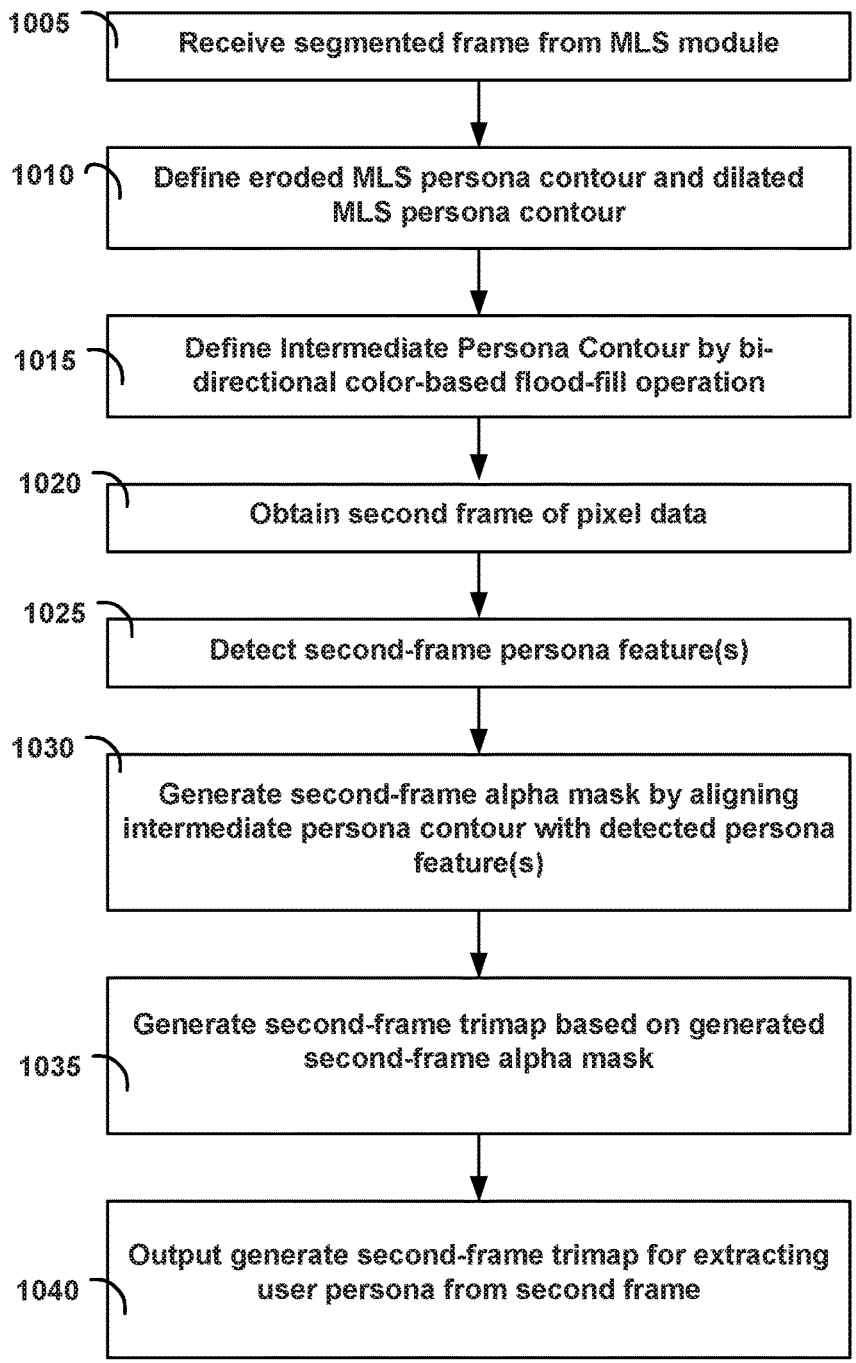
FIG. 10 depicts an exemplary method of persona extraction, in accordance with at least one embodiment.

In some embodiments, the systems and methods disclosed herein relate to a process, as illustrated in FIG. 10.

The process includes receiving a first segmented frame of color pixel data 1005, the first segmented frame comprising an initial-segmentation persona contour that was identified by an MLS process. The process includes defining an eroded MLS persona contour and a dilated MLS persona contour 1010, both based on the initial-segmentation persona contour. The process includes defining an intermediate persona contour 1015, at least in part by performing a bidirectional color-based flood-fill operation outward from the eroded MLS persona contour and inward from the dilated MLS persona contour. The process also includes obtaining a second frame of color pixel data from an input source 1020. The process also includes detecting at least one second-frame persona feature in the second frame 1025. The process also includes generating a second-frame alpha mask 1030, at least in part by aligning the intermediate persona contour with the detected at least one second-frame persona feature.

The process also includes generating a second-frame trimap based on the generated second-frame alpha mask 1035. The process also includes outputting the generated second-frame trimap for use in extracting a user persona from the second frame 1040.

In some embodiments, the obtained second frame is processed in the "reset flag set" path of FIG. 5. In some embodiments, this may occur because updating the MLS result (e.g., step 545) may also include setting the reset flag for a next frame 547 (e.g., the second frame in process 1000).

In some embodiments, the systems and methods may proceed with a third (or next) frame of image data, generally as discussed above in relation to FIG. 5.

In one embodiment, the systems and methods disclosed herein may take the form of an apparatus. The apparatus may comprise a communication interface. The apparatus may comprise a processor. The apparatus may comprise non-transitory, computer readable data storage containing instructions executable by the processor for causing the apparatus to carry out a set of functions, the set of functions comprising any or all of the previous described processes.

Although features and elements are described above in particular combinations, those having ordinary skill in the art will appreciate that each feature or element can be used alone or in any combination with the other features and elements without departing from the scope and spirit of the present disclosure.

What is claimed is:

1. A method comprising:
   obtaining a first frame of color pixel data;
   checking whether a reset flag is cleared or set at a first time;
   generating a trimap for the first frame, wherein:
      if the reset flag is cleared at the first time, then generating the trimap for the first frame comprises:
         obtaining a user-extraction contour that is based on an immediately preceding frame; and
         generating the trimap for the first frame based on the obtained user-extraction contour;
      if the reset flag is set at the first time, then generating the trimap for the first frame comprises:
         detecting at least one persona feature in the first frame;
         generating an alpha mask at least in part by aligning an intermediate persona contour with the detected at least one persona feature, wherein the intermediate persona contour is based on a result of a color-based flood-fill operation having been performed on a previous frame of color pixel data that had been segmented by a machine-learning-segmentation (MLS) process; and
         generating the trimap for the first frame based on the generated alpha mask; and
   outputting the generated trimap for use in extracting a user persona from the first frame.

2. The method of claim 1, wherein if the reset flag is cleared at the first time, then generating the trimap for the first frame further comprises performing an erosion operation inward from the obtained user-extraction contour and a dilation operation outward from the obtained user-extraction contour.

3. The method of claim 1, wherein if the reset flag is set at the first time, generating the trimap for the first frame further comprises performing an erosion operation inward from the generated alpha mask and a dilation operation outward from the generated alpha mask.

4. The method of claim 1, wherein if the reset flag is set at the first time, aligning the intermediate persona contour with the detected at least one persona feature comprises at least one of scaling and translating the intermediate persona contour to fit the detected at least one persona feature.

5. The method of claim 1, further comprising:
   evaluating at least one reset condition;
   if at least a predefined subset of the at least one reset condition is true, responsively setting the reset flag for a following frame; and
   if each of the at least one reset condition is true, responsively communicating an MLS request to the MLS process.

6. The method of claim 1, wherein the at least one reset condition includes:
   (i) an elapsed time from a previous machine-learning segmentation request being greater than a time threshold;
   (ii) a difference between a post-core segmentation user-extraction contour for the first frame and the intermediate persona contour exceeding a difference threshold;
   (iii) a level of motion in the first frame exceeding a motion threshold; and
   (iv) at least one user being detected in the first frame.

7. The method of claim 6, wherein the predefined subset includes reset conditions (i) and (ii).

8. The method of claim 6, wherein the predefined subset consists of reset conditions (i) and (ii).

9. The method of claim 6, wherein the MLS request specifies the first frame as an input to the MLS process.

10. The method of claim 1, further comprising:
    obtaining a second frame of color pixel data;
    checking whether the reset flag is cleared or set at a second time;
    generating a second-frame trimap for the second frame, wherein:
       if the reset flag is cleared at the second time, then generating the second-frame trimap comprises:
          obtaining a post-core segmentation user-extraction contour that is based on the first frame; and
          generating the second-frame trimap based on the obtained post-core segmentation user-extraction contour;
       if the reset flag is set at the second time, then generating the second-frame trimap comprises:
          detecting at least one second-frame persona feature in the second frame;
          generating a second-frame alpha mask at least in part by aligning the intermediate persona contour with the detected at least one second-frame persona feature; and
          generating the second-frame trimap based on the generated second-frame alpha mask; and
    outputting the generated second-frame trimap for use in extracting a user persona from the second frame.

11. The method of claim 10 wherein aligning the intermediate persona contour with the detected at least one second-frame persona feature comprises at least one of scaling and translating the intermediate persona contour to fit the detected at least one second-frame persona feature.

12. A method comprising:
    receiving a first segmented frame of color pixel data, the first segmented frame comprising an initial-segmentation persona contour that was identified by a machine-learning-segmentation (MLS) process;

defining an eroded MLS persona contour and a dilated MLS persona contour, both based on the initial-segmentation persona contour;
defining an intermediate persona contour at least in part by performing a bidirectional color-based flood-fill operation outward from the eroded MLS persona contour and inward from the dilated MLS persona contour;
obtaining a second frame of color pixel data from an input source;
detecting at least one second-frame persona feature in the second frame;
generating a second-frame alpha mask at least in part by aligning the intermediate persona contour with the detected at least one second-frame persona feature;
generating a second-frame trimap based on the generated second-frame alpha mask; and
outputting the generated second-frame trimap for use in extracting a user persona from the second frame.

13. The method of claim 12, wherein the eroded MLS persona contour is defined at least in part by performing an erosion operation inward from the initial-segmentation persona contour, and the dilated MLS persona contour is defined at least in part by performing a dilation operation outward from the initial-segmentation persona contour.

14. The method of claim 12, wherein generating the second-frame trimap comprises eroding and dilating the alpha mask to a lesser extent than is used when defining the eroded MLS persona contour and the dilated MLS persona contour for the first segmented frame.

15. The method of claim 12, wherein aligning the intermediate persona contour with the detected at least one second-frame persona feature comprises at least one of scaling and translating the intermediate persona contour to fit the detected at least one second-frame persona feature.

16. The method of claim 12, further comprising filtering the first segmented frame to exclude pixels whose confidence level, as defined by a confidence map generated by the MLS process, falls below a confidence threshold.

17. The method of claim 12, further comprising:
evaluating at least one reset condition;
if at least a predefined subset of the at least one reset condition is true, responsively setting a reset flag for a following frame; and
if each of the at least one reset condition is true, responsively communicating an MLS request to the MLS process.

18. The method of claim 17, wherein the at least one reset condition includes:
(i) an elapsed time from a previous MLS request being greater than a time threshold;
(ii) a difference between a post-core segmentation user-extraction contour for the second frame and the intermediate persona contour exceeding a difference threshold;
(iii) a level of motion in the second frame exceeding a motion threshold; and
(iv) at least one user being detected in the second frame.

19. The method of claim 18, wherein the predefined subset includes reset conditions (i) and (ii).

20. The method of claim 18, wherein the predefined subset consists of reset conditions (i) and (ii).

21. The method of claim 12, further comprising:
obtaining a third frame of color pixel data;
checking whether a reset flag is cleared or set at a third time;
generating a third-frame trimap, wherein:
if the reset flag is cleared at the third time, then generating the third-frame trimap comprises:
obtaining a post-core segmentation user-extraction contour that is based on the second frame; and
generating the third-frame trimap based on the obtained post-core segmentation user-extraction contour;
if the reset flag is set at the third time, then generating the third-frame trimap comprises:
detecting at least one third-frame persona feature in the third frame;
generating a third-frame alpha mask at least in part by aligning the intermediate persona contour with the detected at least one third-frame persona feature; and
generating the third-frame trimap based on the generated third-frame alpha mask; and
outputting the generated third-frame trimap for use in extracting a user persona from the third frame.

22. An apparatus comprising:
a communication interface;
a processor; and
non-transitory computer readable data storage containing instructions executable by the processor for causing the system to carry out a set of functions, the set of functions comprising:
obtaining a first frame of color pixel data;
checking whether a reset flag is cleared or set at a first time;
generating a trimap for the first frame, wherein:
if the reset flag is cleared at the first time, then generating the trimap for the first frame comprises:
obtaining a user-extraction contour that is based on an immediately preceding frame; and
generating the trimap for the first frame based on the obtained user-extraction contour;
if the reset flag is set at the first time, then generating the trimap for the first frame comprises:
detecting at least one persona feature in the first frame;
generating an alpha mask at least in part by aligning an intermediate persona contour with the detected at least one persona feature, wherein the intermediate persona contour is based on a result of a color-based flood-fill operation having been performed on a previous frame of color pixel data that had been segmented by a machine-learning-segmentation (MLS) process; and
generating the trimap for the first frame based on the generated alpha mask; and
outputting the generated trimap for use in extracting a user persona from the first frame.

* * * * *